United States Patent [19]
Efner et al.

[11] Patent Number: 5,932,671
[45] Date of Patent: Aug. 3, 1999

[54] POLYMERIZATION PROCESS

[75] Inventors: Howard F. Efner; Earl Clark, Jr.; Michael L. Stephens, all of Bartlesville, Okla.

[73] Assignee: Phillips Petroleum Company, Bartlesville, Okla.

[21] Appl. No.: 08/868,728

[22] Filed: Jun. 4, 1997

[51] Int. Cl.$^6$ .................................................... C08F 2/38
[52] U.S. Cl. ............................................ 526/211; 526/214
[58] Field of Search ..................................... 526/211, 214, 526/222, 224

[56] References Cited

U.S. PATENT DOCUMENTS

| | | | |
|---|---|---|---|
| 3,975,341 | 8/1976 | Trapasso | 526/303 |
| 4,189,552 | 2/1980 | Kuwata et al. | 526/211 |
| 4,265,796 | 5/1981 | Mueller-Mall et al. | |
| 4,450,261 | 5/1984 | Chiao et al. | 526/214 |
| 4,464,508 | 8/1984 | Easterly, Jr. | 524/787 |
| 4,753,981 | 6/1988 | Clark, Jr. | 524/801 |
| 5,420,004 | 5/1995 | Fujita | 430/559 |

*Primary Examiner*—Christopher Henderson
*Attorney, Agent, or Firm*—Lucas K. Shay

[57] ABSTRACT

A process for producing a water-soluble polymer which can be useful in a subterranean formation is provided. The process comprises contacting a an olefinic compound and a thiol under a solution polymerization process for producing the water-soluble polymer.

5 Claims, No Drawings

5,932,671

POLYMERIZATION PROCESS

FIELD OF THE INVENTION

The present invention relates to a process which can be used to produce water-soluble polymers that can be useful in oil field applications.

BACKGROUND OF THE INVENTION

Polymers are a class of important chemicals that find a variety of industrial uses. For example, polymers can be used to change the rheological property of a fluid such as food products and drilling muds. Production of polymers are well known. However, in many instances, polymers produced in a reactor are not flowable under normal operating conditions. The polymers therefore cannot be conveyed or pumped or transported by any means known to one skilled in the art to a drying means for further processing. Accordingly, it is desirable to develop an improved process for producing a polymer that can be easily transported to a drying means to dry the polymer.

SUMMARY OF THE INVENTION

An object of the invention is to provide a process for synthesizing a polymer composition. Also an object of the invention is to provide a process for controlling the molecular weight of the composition. An advantage of the invention is that the process of the invention can control the molecular size or weight of the composition. Other objects, features, and advantages will become more apparent as the invention is more fully disclosed hereinbelow.

According to the present invention, a process for preparing a polymer composition is provided. The process comprises contacting a polymerizable olefinic compound with a thiol compound.

DETAILED DESCRIPTION OF THE INVENTION

According to the present invention, a process for producing a polymer composition which can be soluble in water is provided. The preferred composition can withstand a hostile environment and can be used for treating a hydrocarbon-bearing subterranean formation. The water-soluble composition comprises, or consists essentially of, or consists of, a polymer which comprises repeat units derived from at least one water-soluble, polymerizable olefinic compound.

The term "polymer" as used herein denotes a molecule having at least about 10 repeat units and can be homopolymer, copolymer, terpolymer, tetrapolymer, or combination of any two or more thereof. The term "liquid" can be pure water, regular tap water, a solution, a suspension containing undissolved particles, or combinations thereof. The term "substantial" or "substantially" refers to "more than trivial" and can be "near entirely".

Any olefinic compounds having a polymerizable ethylenic linkage and being capable of producing a polymer can be used for preparing the water-soluble polymer of the present invention. Presently a preferred monomer is a nitrogen-containing olefin compound. Though it is not necessary, it is preferred that the ethylenic linkage be at the terminal end of the nitrogen-containing olefin molecule and that at least one nitrogen be a tertiary amine. The presently preferred olefinic compounds include, but are not limited to, $R_1-C(_R)=C(R_1)-(C=O)_m-(N(R_1))_m-(Y)_m-(N(R_1))_m-(C=O)_m-(Y)_m-W.R_1$ and $R_2$ can be the same or different and are each independently selected from the group consisting of hydrogen, alkyl radicals, aryl radicals, aralkyl radicals, alkaryl radicals, and combinations of two or more thereof wherein each radical can contain 1 to about 30, preferably 1 to about 20, more preferably 1 to about 15, and most preferably 1 to 10 carbon atoms and can contain functionalities such as, for example, hydroxyl, sulfate, carbonyl, carboxyl, amine, amide, sulfhydryl, or combinations of any two or more thereof. Preferably $R_1$ is hydrogen and $R_2$ is hydrogen, methyl, ethyl, or combinations of two or more thereof. Y can be an alkylene radical, an arylene radical, an imidazolium group, a naphthylene group, a biphenylene group, a pyridinylene group, a piperazine group, a morpholine group, a 5-, 6-, or 7-membered ring, or combinations of two or more thereof which can have 1 to about 20, preferably 1 to about 15, and most preferably 1 to 10 carbon atoms. Most preferably, Y is a short alkylene radical having 1 to about 5 carbon atoms. W is selected from the group consisting of amines, halides, sulfate, phosphate, nitrate, sulfonates, phosphonates, sulfinates, phosphinates, and combinations of two or more thereof. Each m can be the same or different and is independently 0 or 1.

The olefinic compounds are either commercially available or can be produced by the process disclosed in the U.S. Pat. No. 5,650,633, disclosure of which is herein incorporated by reference.

Examples of suitable olefinic compounds of the invention include, but are not limited to, acrylamide, styrene sulfonic acid, salts of styrene sulfonic acid, N-methylacrylamide, N,N-dimethylacrylamide, acrylic acid, salts of acrylic acid, N-vinylpyrrolidone, methyl acrylate, methacrylic acid, salts of methacrylic acid, vinyl sulfonic acid, salts of vinyl sulfonic acid, 2-acrylamido-2-methylpropanesulfonic acid, salts of 2-acrylamido-2-methylpropanesulfonic acid, ethyl acrylate, propyl acrylate, methyl methacrylate, ethyl methacrylate, dimethylaminoethyl acrylate, dimethylaminoethyl methacrylate, diethylaminoethyl acrylate, diethylaminoethyl methacrylate, hydroxyethyl acrylate, hydroxyethyl methacrylate, styrene acrylonitrile, 3-(methylacrylamido) propyltrimethylammonium chloride, vinyl methyl ether, vinyl ethyl ether, vinyl pyridine, N-vinyl-2-pyrrolidone, vinyl imidazole, diallyl dimethylammonium chloride, N-acryloyl morpholine, N-acryloyl-N'-methyl piperazine, N-acryloyl-N'-ethyl piperazine, N-acryloyl-N'-propyl piperazine, N-acryloyl-N'-(3-sulfopropyl)-N'-methyl piperazinium inner salt, N-acryloyl-N'-(3-sulfopropyl)-N'-ethyl piperazinium inner salt, N-acryloyl-N'-(4-sulfopropyl)-N'-methyl piperazinium inner salt, N-acryloyl-N'-(4-sulfopropyl)-N'-ethyl piperazinium inner salt, N-acryloyl-N'-(2-amino-2-oxoethyl)-N'-methyl piperazinium chloride, N-acryloyl-N'-(3-amino-3-oxopropyl)-N'-methyl piperazinium chloride, N-acryloyl-N'-(4-amino-4-oxobutyl)-N'-methyl piperazinium chloride, N-acryloyl-N'-(2-amino-2-oxoethyl)-N'-ethyl piperazinium chloride, N-acryloyl-N'-(3-amino-3-oxopropyl)-N'-ethyl piperazinium chloride, N-acryloyl-N'-(4-amino-4-oxobutyl)-N'-ethyl piperazinium chloride, N,N-dimethyl-N-(3-sulfopropyl)-N-(4-vinylbenzyl) ammonium inner salt, N,N-dimethyl-N-(4-sulfobutyl)-N-(4-vinylbenzyl) ammonium inner salt, N,N-diethyl-N-(3 -sulfopropyl)-N-(4-vinylbenzyl) ammonium inner salt, N,N-diethyl-N-(4-sulfobutyl)-N-(4-vinylbenzyl) ammonium inner salt, N,N-dimethyl-N-(3-sulfopropyl)-N-(3-vinylbenzyl) ammonium inner salt, N,N-dimethyl-N-(4-sulfobutyl)-N-(3-vinylbenzyl) ammonium inner salt, N,N-diethyl-N-(3-sulfopropyl)-N-(3-vinylbenzyl) ammonium inner salt, N,N-diethyl-N-(4-sulfobutyl)-N-(3-vinylbenzyl) ammonium inner salt, N,N-dimethyl-N-(2-amino-2-oxoethyl)-N-(4-vinylbenzyl) ammonium chloride, N,N-diethyl-N-(2-amino-2-oxoethyl)-N-(4-vinylbenzyl) ammonium chloride, N,N-dimethyl-N-(3-amino-3-oxopropyl)-N-(4-vinylbenzyl) ammonium chloride, N,N-diethyl-N-(3-amino-3-oxopropyl)-N-(4-vinylbenzyl) ammonium chloride, N,N-dimethyl-N-(2-amino-2-oxoethyl)-N-(3- vinylbenzyl) ammonium chloride, N,N-diethyl-N-(2-amino-2-oxoethyl)-N-(3-vinylbenzyl) ammonium chloride, N,N-dimethyl-N-(3-amino-3-oxopropyl)-N-(3-vinylbenzyl) ammonium chloride, N,N-diethyl-N-(3-amino-3-oxopropyl)-N-(3-vinylbenzyl) ammonium chloride, N-(2-amino-2-oxoethyl)-N'-vinyl imidazolium chloride, N-(3-amino-3-oxopropyl)-N'-vinyl imidazolium chloride, N-(4-amino-4-oxobutyl)-N'-vinyl imidazolium chloride, N,N-dimethyl-N-(3-sulfopropyl)-3-(acryloyl amino)-1-propane ammonium inner salt, N,N-diethyl-N-(3-sulfopropyl)-3-(acryloyl amino)-1-propane ammonium inner salt, N,N-dimethyl-N-(4-sulfobutyl)-3-(acryloyl amino)1-propane ammonium inner salt, N,N-diethyl-N-(4-sulfobutyl)-3-(acryloyl amino)-1-propane ammonium inner salt, N,N-dimethyl-N-(3-sulfopropyl)-2-(acryloyl amino)-1-ethane ammonium inner salt, N,N-diethyl-N-(3-sulfopropyl)-2-(acryloyl amino)-1-ethane ammonium inner salt, N,N-dimethyl-N-(4-sulfobutyl)-2-(acryloyl amino)-1-ethane ammonium inner salt, N,N-diethyl-N-(4-sulfobutyl)-2-(acryloyl amino)-1-ethane ammonium inner salt, and combinations of any two or more thereof. The salts can be an ammonium salt, an alkali metal salt, or combinations of two or more thereof.

The water-soluble polymers of the present invention can be prepared by mixing an olefinic compound, in any desired quantity, and a thiol, in desired molar ratios if copolymers, terpolymers, or tetrapolymers are desired, in an appropriate aqueous medium and then initiating the free-radical polymerization in the aqueous solution. Generally, any molar ratios can be employed depending on the final polymer desired. The aqueous solution can comprise a small amount, i.e., less than 20 weight %, one or more water-miscible organic solvent such as, for example, ketones, alcohols, amides, ethers, esters, or combinations of two or more thereof.

Suitable thiol for use according to the invention can be represented by the general formula HS-Y(A)$_x$ wherein A is selected from the group consisting of —OH, —CO$_2$H, and —CO$_2$R$_2$, and combinations of two or more thereof wherein Y and R$_2$ can be the same as those disclosed above. Preferably the thiol has from 2 to 7 carbon atoms per molecule and x is 1, 2 or 3. The thiols which are defined by the above-mentioned formula are preferably substantially water-soluble. The amount of thiol employed according to the invention and defined according to the above-mentioned formula is a molecular weight-suppressing amount or an amount that can lower the molecular weight of the resultant polymer as compared to the molecular weight of polymer produced in the absence of the thiol. It generally can be about 0.00001 to about 20, preferably about 0.0001 to about 10 parts, more preferably about 0.0005 to about 5 parts, and most preferably 0.001 to 2 parts by weight of thiol per 100 parts by weight of the olefinic monomer. Examples of suitable thiols for use according to the invention include, but are not limited to 2-mercaptoethanol, mercaptoacetic acid, methyl 3-mercaptopropionate, 3-mercaptopropionic acid, 3-mercapto-1-propanol, 3-mercapto-1,2-propanediol, mercaptosuccinic acid, propyl mercaptoacetate, ethyl mereaptoacetate, methyl mercaptoacetate, dimethyl 2-mercaptomalonate, phenyl mercaptoethanol, and combinations of any two or more thereof. For reasons of ready availability and effectiveness, the preferred thiols include 2-mercaptoethanol, mercaptoacetic acid, and methyl 3-mercaptopropionate.

Well known compounds commonly employed to initiate free radical polymerization reactions include peroxides such as hydrogen peroxide, p-methane hydroperoxide, cumene hydroperoxide, benzoyl peroxide, di-t-butyl peroxide, and t-butyl peroxyacetate; azo compounds such as, for example, 2,2'-azobisisobutyronitrile, 2,2'-azobis(2,4-dimethylvaleronitrile), and 2,2'-azobis(2-(2-imidazolin-2-yl)propane) dihydrochloride; alkali metal persulfates such as $K_2S_2O_8$; alkali metal perborates; alkali metal perphosphates; and alkali metal percarbonates. Well known organic peroxide compounds commonly employed to initiate free radical polymerization reactions include lauryl peroxide, 2,5-dimethyl-2,5-bis(2-ethylhexanoylperoxy)hexane, t-butylperoxyprivilate, t-butylperoctoate, p-methane hydroperoxide, and benzoylperoxide. The compound t-butylhyponitrite is a well known alkyl hyponitrite commonly employed to initiate free radical polymerization reactions. Furthermore, ultraviolet light, gamma irradiation and "redox reactions" are commonly employed to initiate free radical polymerization reactions. In addition, such other methods of polymerization as would have occurred to one skilled in the art may be employed, and the present invention is not limited to the particular method of preparing the polymer set out herein. The presently preferred free radical initiator system is a water-soluble free radical initiator. Because the detailed polymerization techniques and the concentration of free radical initiator are well known to one skilled in the art, the description of which is omitted herein for the interest of brevity.

The contacting of an olefinic compound and a thiol is generally in an aqueous solution and under a solution polymerization condition that can produce a desired polymer having a desired molecular weight. Generally, the solution polymerization process can be carried out at a temperature in the range of from about 0 to about 150° C., preferably about 5 to about 100° C., and most preferably 10 to 80° C. under a pressure that can accommodate these temperature ranges.

If copolymers, terpolymers, or tetrapolymers are desired, the molar ratio of an olefinic monomer to other olefinic monomer(s) can be any ratio so long as the ratio can produce a polymer whose molecular weight can be controlled by the process of the invention. Generally, the molar ratio can be in the range of from about 0.01:1 to about 100:1, preferably about 0.05:1 to about 50:1, and most preferably 0.1:1 to 30:1.

According to the invention, the composition of the invention can be used as or in a fluid composition such as drilling fluid, completion fluid, or workover fluid which can further comprise a solid such as clay or cement, and a liquid.

Examples provided hereinbelow are intended to assist one skilled in the art to further understand the invention and should not be considered limitative.

EXAMPLE I

This example illustrates the production of polymers using the process of the present invention.

The polymerizations were conducted in a 1 liter jacketed glass resin flask equipped with a mechanical stirrer equipped with a stainless steel axial flow impeller, thermocouple, nitrogen inlet fitted with a gas dispersion tube, and a reflux condenser. The polymerizations were conducted at 10 weight percent solids using a 500 g reactor charge. Deionized water was used throughout. Ethylenediamine tetraacetic acid tetrasodium salt (EDTA) (0.05 PHM) (PHM=parts by weight per 100 parts by weight of monomer) was added to chelate any metals that may be present. Temperature was controlled by circulating water, from a temperature controlled bath, through the resin flask jacket. In a typical run, the water, monomer(s), EDTA, and 2-mercaptoethanol (BME) were charged to the reactor, degassed with nitrogen for 10 minutes and brought to reaction temperature (typically about 40 to about 50° C.) during the degassing step. The initiator (sodium persulfate, 1 PHM) was then added as a 19.05 weight % solution in deoxygenated deionized water. The polymerization was allowed to proceed until completed (typically about 2 to about 8 hours). The product was allowed to cool and was removed. Solution viscosities were determined for the polymer as produced with a Brookfield viscometer (#1 spindle at 100 RPM except as noted in Tables I–II).

The results for a series of polymers containing 10 mole % N-acryloylmorpholine, and 90 mole % sodium acrylate are shown in Table I (polymers A–F). The results show a significant decrease in viscosity with increasing mercaptan content giving easily pumped polymer solution.

A second series of polymer were prepared from a monomer mixture of 10 mole % N-vinylpyrrolidone and 90 mole % sodium acrylate. The result as shown in Table I (polymers G–L) again show the effectiveness of 2-mercaptoethanol at reducing the molecular weight, and hence the solution viscosity in a controlled manner. It should be noted that the N-vinylpyrrolidone/sodium acrylate copolymers did not tend to viscosify water to a large extent.

A third series of polymers were prepared from acrylamide. The results shown in Table II (polymers 1–6) also show that 2-mercaptoethanol was very effective on controlling the viscosity of the resulting polyacrylamide polymer.

A fourth series of polymers containing 10 mole% N-acryloyl morpholine and 90 mole% acrylamide were also prepared. These polymers (polymers 7–12; Table II) were produced in a solution polymerization process using sodium persulfate as the initiator and 2-mercaptoethanol as a molecular weight modifier. Low levels of BME were highly effective in regulating the molecular weight of the polymer and gave pumpable solutions instead of rigid gels.

TABLE I

Viscosity of Acrylate-Containing Polymers

| Polymer | BME[a] | Viscosity (cP)[b] |
|---|---|---|
| A | 0.075 | 78.5 |
| B | 0.05 | 76.5 |
| C | 0.025 | 152[c] |
| D | 0.01 | 210[d] |
| E | 0.005 | 290[d] |
| F | none | 870[e] |
| G | 0.075 | 24.0 |
| H | 0.05 | 25.5 |
| I | 0.025 | 28.5 |
| J | 0.01 | 31.5 |
| K | 0.005 | 33.5 |
| L | none | 34.0 |

[a]BME = 2 mercaptoethanol; the values shown are parts by weight BME per 100 parts by weight monomer.
[b]cP = centipoise; viscosity measured with polymer solution as produced at 100 rpm except footnotes c, d, and e with #1 spindle.
[c]Viscosity measured at 50 rpm.
[d]Viscosity measured at 20 rpm.
[e]Viscosity measured at 10 rpm.

TABLE II

| Polymers | PHM[a] $Na_2S_2O_8$ | PHM BME[b] | Viscosity (cP)[c] 0.5% |
|---|---|---|---|
| 1 | 0.3 | None | 25 |
| 2 | 0.3 | 0.1 | 22.5 |
| 3 | 0.3 | 0.4 | 23.5 |
| 4 | 0.1 | 0.05 | 13.5 |
| 5 | 0.1 | 0.02 | 16 |
| 6 | 0.1 | 0.01 | 21.5 |
| 7 | 0.1 | 0.02 | 16 |
| 8 | 0.1 | 0.015 | 15 |
| 9 | 0.1 | 0.01 | 17 |
| 10 | 0.1 | None | 75.2 |
| 11 | 0.1 | 0.005 | 30 |
| 12 | 0.1 | 0.01 | 19 |

[a]PHM = parts by weight per 100 parts by weight monomer.
[b]BME = 2-mercaptoethanol
[c]cP = centipoise; viscosity measured with 0.5 weight % of polymer in deionized water at 100 rpm with #1 spindle.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. In a process for the production of a water soluble polymer by the polymerization of an olefinic compound selected from the group consisting of acrylamide, acryloyl morpholine, N-vinyl pyrrolidone and sodium acrylate under solution polymerization conditions in the presence of a polymerization initiator the improvement which comprises carrying out said polymerization in the presence of 2-mercaptoethanol, said 2-mercaptoethanol being present in an amount sufficient to lower the molecular weight of the resulting water soluble polymer when compared to the molecular weight of the polymer produced in the absence of said 2-mercaptoethanol.

2. A process in accordance with claim 1 wherein said olefmic compound is acrylamide.

3. A process in accordance with claim 1 wherein said olefinic compound is a mixture of N-acryloyl morpholine and sodium acrylate.

4. A process in accordance with claim 1 wherein said olefinic compound is a mixture of N-vinyl pyrollidine and sodium acrylate.

5. A process in accordance with claim 1 wherein said olefmic compound is a mixture of N-acryloyl morpholine and acrylamide.

* * * * *